A. F. POOLE.
CALCULATING MACHINE.
APPLICATION FILED NOV. 6, 1916.

1,334,316.

Patented Mar. 23, 1920.
6 SHEETS—SHEET 1.

Inventor:
Arthur F. Poole

A. F. POOLE.
CALCULATING MACHINE.
APPLICATION FILED NOV. 6, 1916.

1,334,316.

Patented Mar. 23, 1920.
6 SHEETS—SHEET 3.

Inventor
Arthur F. Poole

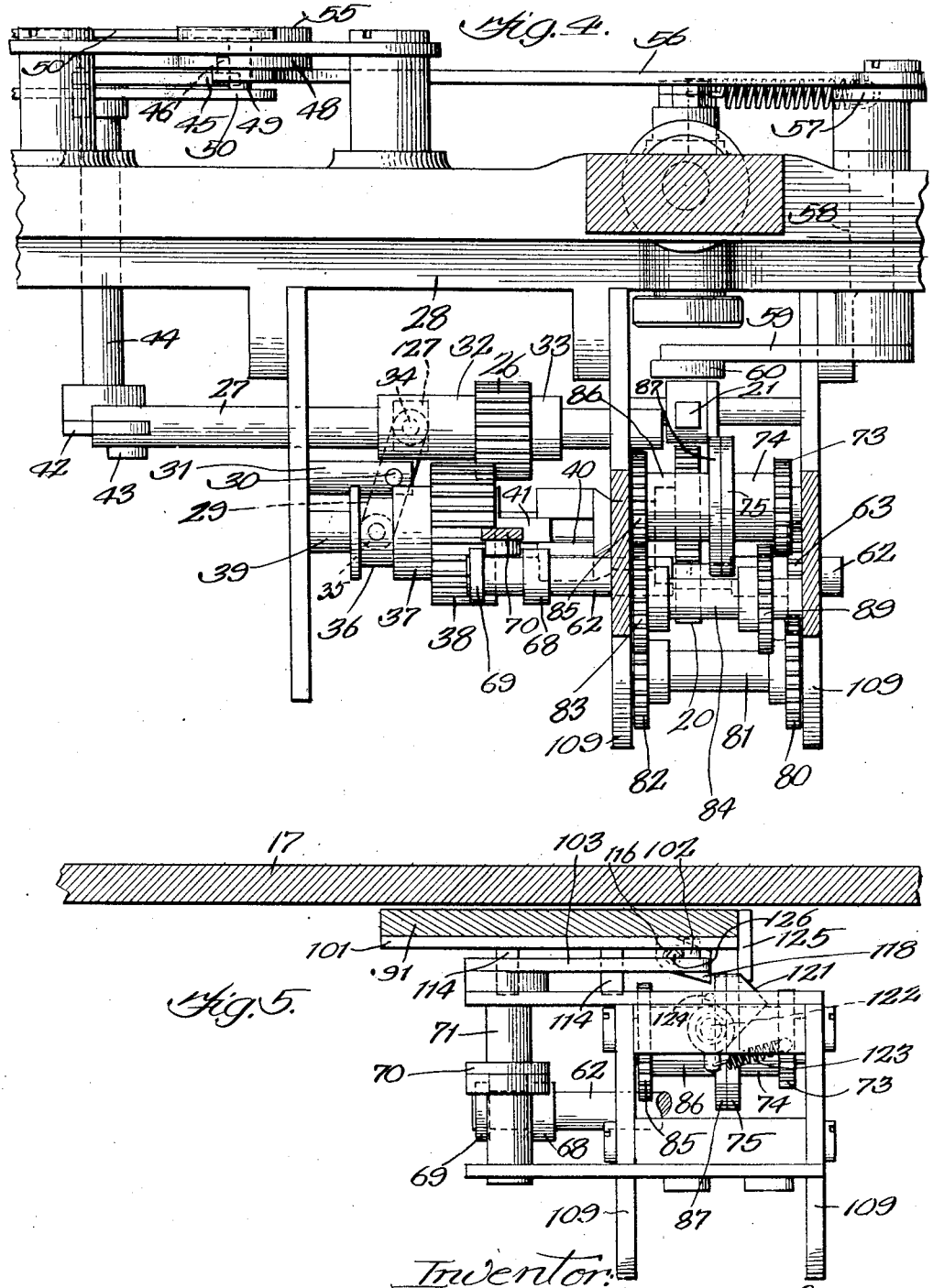

A. F. POOLE.
CALCULATING MACHINE.
APPLICATION FILED NOV. 6, 1916.
1,334,316.
Patented Mar. 23, 1920
6 SHEETS—SHEET 5.
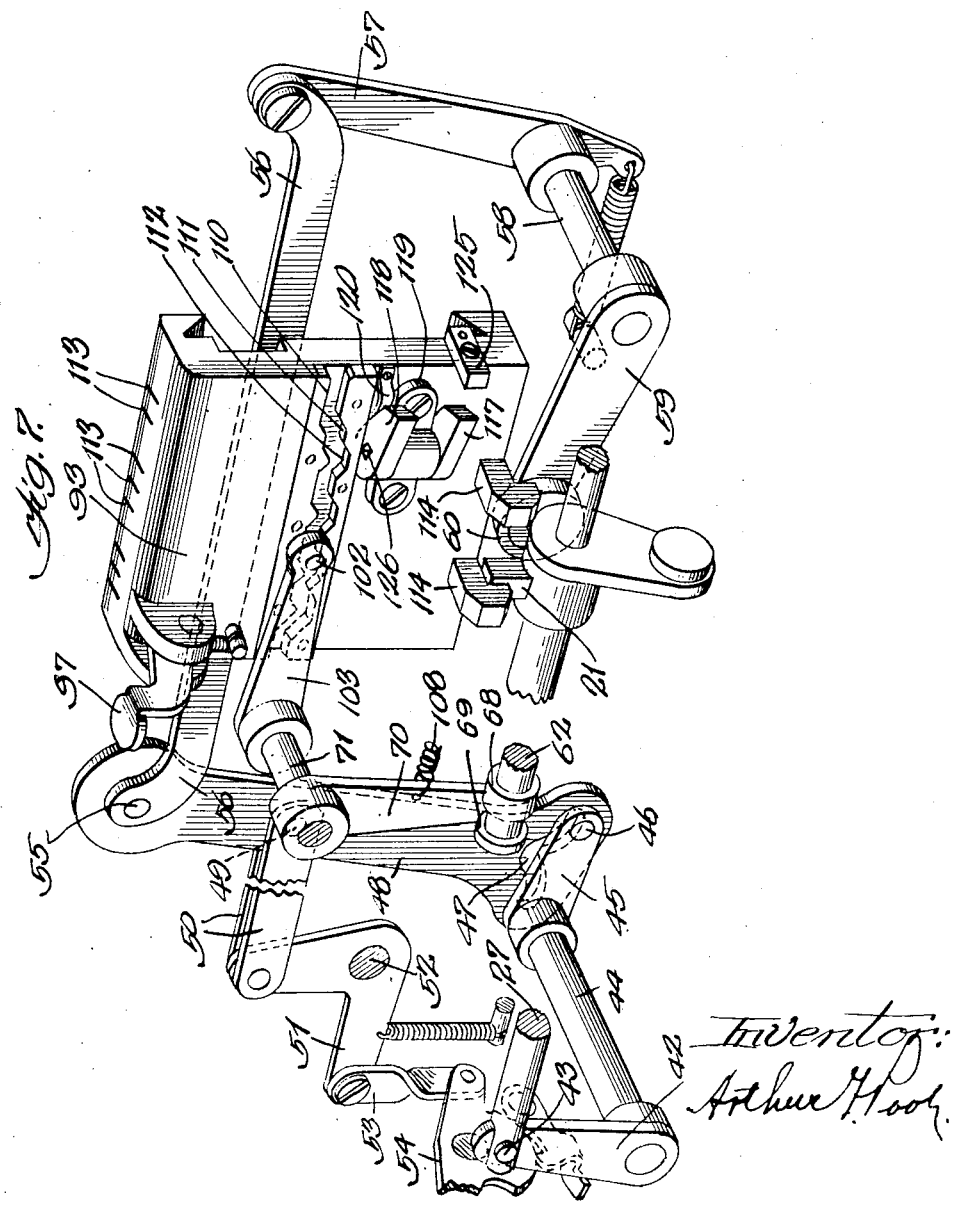

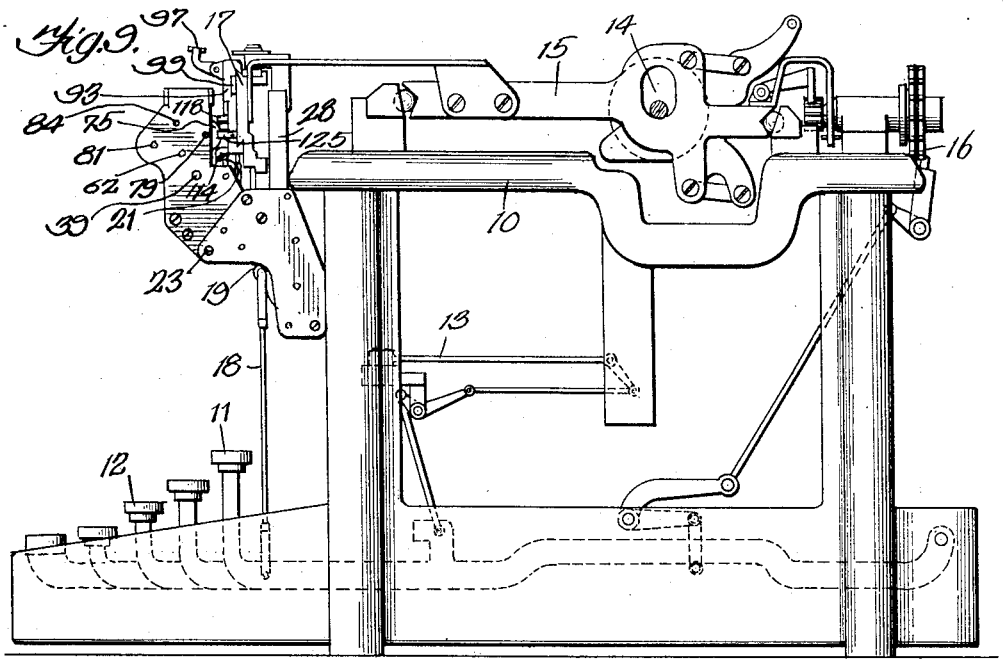

UNITED STATES PATENT OFFICE.

ARTHUR F. POOLE, OF KENILWORTH, ILLINOIS, ASSIGNOR, BY MESNE ASSIGNMENTS, TO THE WAHL COMPANY, OF WILMINGTON, DELAWARE, A CORPORATION OF DELAWARE.

CALCULATING-MACHINE.

1,334,316.  Specification of Letters Patent.  Patented Mar. 23, 1920.

Application filed November 6, 1916. Serial No. 129,740.

*To all whom it may concern:*

Be it known that I, ARTHUR F. POOLE, a citizen of the United States, residing at Kenilworth, in the county of Cook and State of Illinois, have invented a certain new and useful Improvement in Calculating - Machines, of which the following is a specification.

My invention is a checking machine having for its purpose the checking of numbers which have been previously computed. My invention also includes a new method of handling accounts in which original items are first written and computed by one operator and then afterward the same original items are handled and computed by a second operator for the purpose of making a duplicate sheet containing a record of these items. An instance is in the well known bank problem, in which the customer's deposit slips and paid checks are first sent to the bookkeeper who makes a ledger record thereof. These deposit and paid check items are handled a second time by a customer's statement clerk for the purpose of making a record to be delivered to the customer on the first of every month, as a statement of his account with the bank. As these two sheets have been formerly kept it was necessary for each operator or clerk to compute the items after they had been entered, that is, the ledger clerk entered the items, brought down the customer's former balance and computed his current balance. Similarly the customer's statement clerk entered the items on the customer's statement sheet, brought down the prior balance shown on said sheet and computed the current balance.

It is well recognized that accountants are not infallible, that mistakes will occur and that any system of handling accounts must be designed so as to afford a ready detection of any errors that have been made.

In the particular problem mentioned, there are two checks which are in use.

The first is for both the ledger clerk and the customer's statement clerk to do their work on a calculator equipped with a cross totalizer for computing the daily balances and a series of vertical totalizers which accumulate the grand totals of all the checks, deposit slips, prior balances and current balances which have been written by the ledger clerk during a given period. The customer's statements are made on a similarly equipped machine and at the end of a given run, usually a day, the grand totals of the ledger clerk are compared with the grand totals of the customer's statement clerk. In case these totals agree the work is taken as proved. However, there is an error which is liable to occur which the above described method of checking grand totals will not catch, that is, an error known as a "switch." This consists in charging to the account of John Jones an item which should be charged to the account of James Jones. The result of an error of this kind by either the ledger clerk or the statement clerk is that there are two balances which will not agree, the balances of John Jones and of James Jones, and it is obvious since these two errors counterbalance each other that the grand totals of the statement clerk will check up with the grand totals of the ledger clerk even though one or both of said clerks has made a switch or several of them.

To eliminate the possibility of a switch there is a second method of checking commonly in use. This consists of having the statement clerk and the ledger clerk compare individual current balances after the day's work has been written up. The ledger clerk, for instance, will call off the individual balances in rotation to the statement clerk who will compare them with the balances shown on his sheets. In case any discrepancy is found between the balance of an individual depositor as shown by the ledger sheet and the customer's statement sheet, these sheets are put to one side for future examination. After all erroneous sheets have been separated from the day's work, the original items are then gone over and the error is located as one on the part of the statement clerk or the ledger clerk or both.

This latter method of checking will detect a switch except in the rare case of both operators making the identical error. If one operator charged a check to James Jones which should have been charged to John Jones, and the second operator entered all the items correctly there will be two balances which will not check viz. that of John Jones and that of James Jones, and discovery of this error will take place when the "calling back" check is applied. This "calling back" method is the one which is in most common use. However, this method involves the writing and computation of the original items by one operator and the writing and computation of the same items by the second operator and then an oral comparison of the work of the two operators balance by balance.

It is one of the objects of my invention to simplify the handling of accounts of this kind and to this end, I will describe a new method of handling these accounts and in addition the mechanism of a special machine which is designed to carry this method into practice.

In my herein described application a method of handling bank accounts is described and these may be taken as typical as a number of accounts of a similar nature, such for instance as department-stores, ledger posting and billing, etc. I will throughout this specification speak of only the use of my improved method and machine as applied to the bank problem, although both my method and machine may be applied to the handling of other accounts. In my herein described method the original items, that is, canceled checks and deposit slips are first handled by a ledger clerk on a machine which is equipped with a single cross totalizer. There are a number of machines on the market which are suitable for this purpose, one example of which is the well known Burroughs bank statement machine, which is described in Patents Nos. 1,172,484 and 1,179,564 issued to F. C. Rinsche.

The accounts could also be handled on a cross footing machine equipped with vertical totalizers, an instance of which is shown in my issued Patent #1,198,051 dated September 12th, 1916. However, the presence of the accumulation of the grand totals of credits and debits as would be done in case the original items were computed in the machine disclosed in my cited issued patent is not material to my present method although the accumulation of said grand totals may be of value in connection with other statistical work of the bank. Another machine suitable for this work is the well known Wahl cross footing machine marketed by the Remington Typewriter Co.

As the original items are handled by the ledger clerk, his machine will make a tally roll or list of the current balances of the customers, as said balances are written on the ledger sheet. In order to do this it is only necessary that the printing mechanism which prints on the work sheet shall be equipped with any of the well known tally roll devices of the prior art.

When the ledger clerk has handled all his day's work, he will have made, first: an entry of the original items and the current balances on all the proper individual ledger sheets and second: a tally roll or list of all of the customer's current balances as they stand at the end of the day's business. The original items and the tally roll or list of the balances are then handled by a second operator whose duty it is to make out the customer's statement. It is at this point that my method begins to differ from the methods heretofore in use.

The machine upon which the customer's statements are made is not equipped with a totalizer at all but is equipped only with a checking device somewhat along the lines disclosed in a certain one of my copending applications. The second operator lists the checks, and deposit slips, writes down the previous day's balance, but since her machine is equipped with no device to compute the total of these items, she writes the current balance from the tally roll sheet made by the ledger clerk. In case this total is the result of a correct computation of the items previously written by the second operator, the checking machine will show clear. In case this total is incorrect the checking machine will be locked up and an investigation of the error must take place before any other writing can be done by the second operator.

When an error occurs it may arise from one or all of a variety of causes. The first operator may have made a mistake in entering one of the original items, that is, either in the way of wholly omitting said item, by entering it into the wrong account or by entering the item into the proper account but with the wrong amount. The first operator may also have made a mistake in picking up the prior day's balances, or he may have made a mistake in copying the current balance from the totalizer. Any one of these errors may also have been made by the second operator. However, when an error has been made by either operator, the checking machine will give an indication that in writing a particular customer's statement a mistake has been made somewhere and this indication is given by the fact of the checking machine being locked. It is necessary for the second operator or an inspector then and there to compare the original items with these items as entered on both the customer's statement and the ledger sheets. The responsibility for the mistake is located at once and this correction is made during the time that the particular statement sheet is in the machine of the second operator.

When the day's work has been done and all the sheets have been checked, the operators know, first: that all debits and credits have been correctly entered and to the right account; second: that all prior balances have been correctly picked up and third: that all current balances have been correctly transcribed. In other words the entire set of both ledger sheets and customer's statement sheets may be taken as proved.

Owing to the fact of the second or checking machine not being provided with any totalizing device, its key action is much lighter than if a totalizer were operated by the machine. The second operator can therefore, make much greater speed than is possible in the devices of the prior art by the methods now employed in handling these statements and my method has the additional advantage that at the conclusion of the day's run when everything is checked there is proof that the entire work has been correctly done and furthermore, during the progress of the work that the mistakes are indicated at the time at which they occur and can be corrected immediately. This latter consideration is a marked advantage over any method in which the work is first written and then by the non-checking of a grand total or by the non-checking of the individual balances, as they are called back, existence of an error which must afterward be searched for is found.

Having in a general way outlined my improved method and the results that my checking machine is designed to accomplish, I will now enter upon a description of the machine itself. This can be best understood by reference to the following figures:

Fig. 4 is a top view of some parts of Figs. 2 and 3.

Fig. 5 is a detail.

Fig. 6 is a detail of the manual shift handle.

Fig. 7 is a perspective view of some of the parts shown in the various other figures.

Fig. 9 is a side view of the machine, and

Fig. 10 is a perspective of the gears for computing the 9 and 11 functions on the numbers written on the work sheets.

Similar numerals of reference serve to identify like parts in all of the figures.

Figure 1:
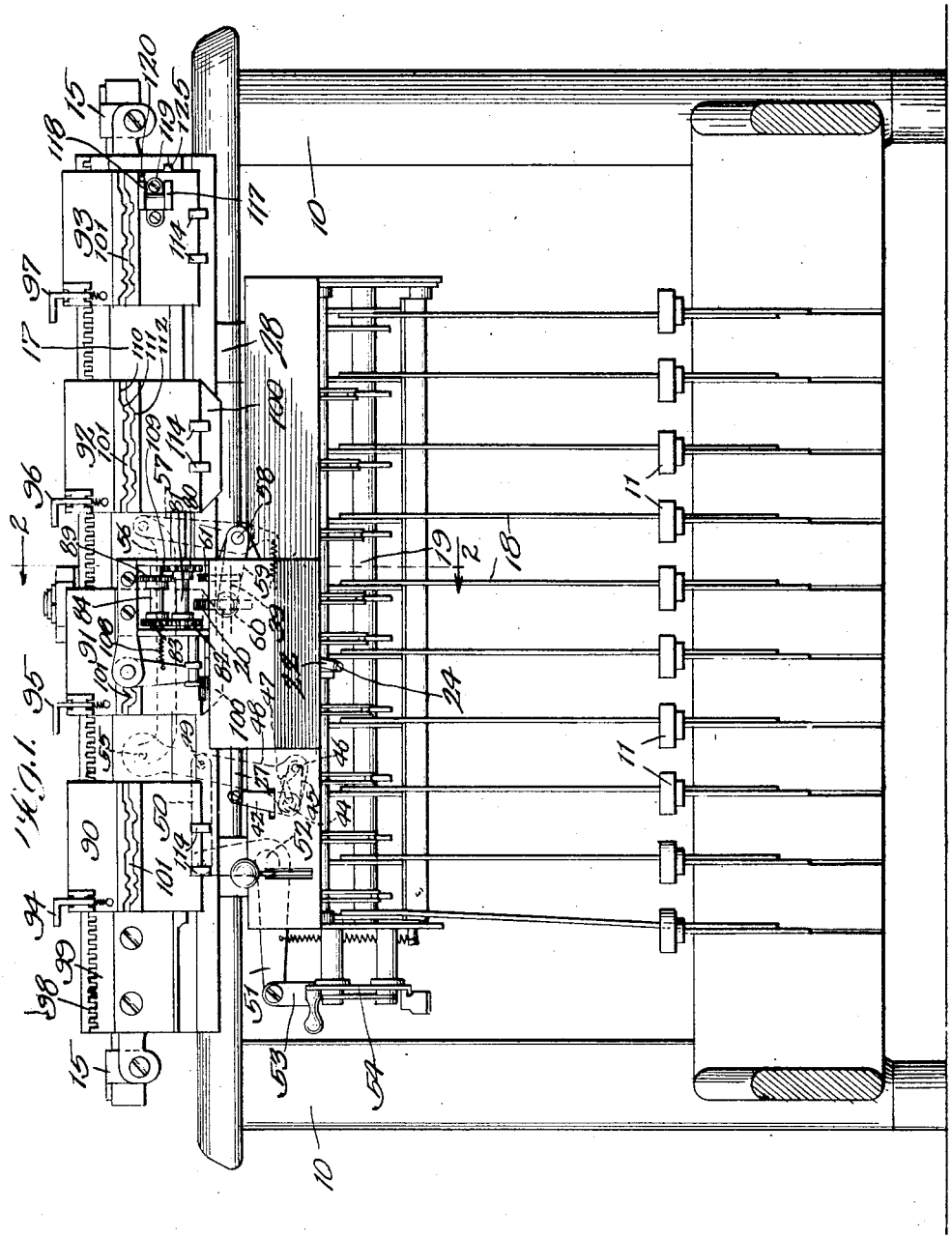
Figure 1 is a front elevation.

In Figs. 1 and 9, a Remington type typewriter 10 is disclosed which contains a set of numeral keys 11, letter keys 12, type bars 13, and a platen 14 mounted on a carriage 15 which is controlled by an escapement 16 actuated by any of the numeral keys 11 or letter keys 12. The before mentioned devices are well known in the art and detailed description of them will therefore be omitted.

Traveling with the carriage 15 is a truck 17 which is similar in design to the truck of the well known Wahl adding machine described particularly in the issued patent of Bester R. Webster #968103, August 23rd, 1910. As the keys 11 or 12 of the typewriter are operated the truck 17 travels step by step with the carriage. The numeral keys 11 are each connected by a pull rod 18 to an actuator to which I shall give the general number of 19. Said actuator is substantially like the actuator present in the cited Wahl machine and patents issued thereon, particularly that to John C. Wahl #893719, July 21st, 1908, and its function is the translation of a vertical motion of any of the numeral keys 11 into a rotation of a wheel 20 a number of steps corresponding to the particular numeral keys 11 which has been operated.

Figure 2:
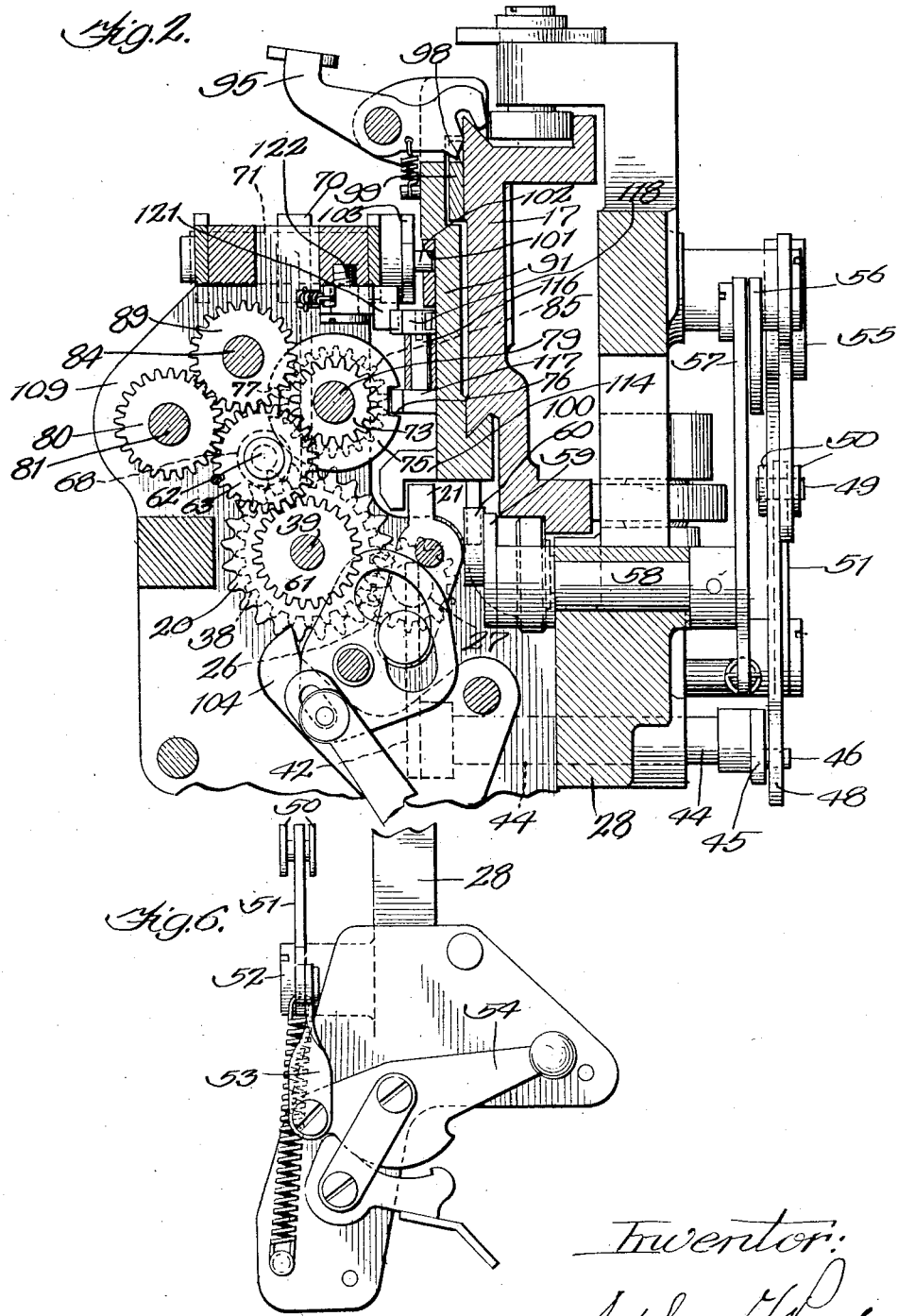
Fig. 2 is a view partly in section along the line 2—2 of Fig. 1.
Figure 3:
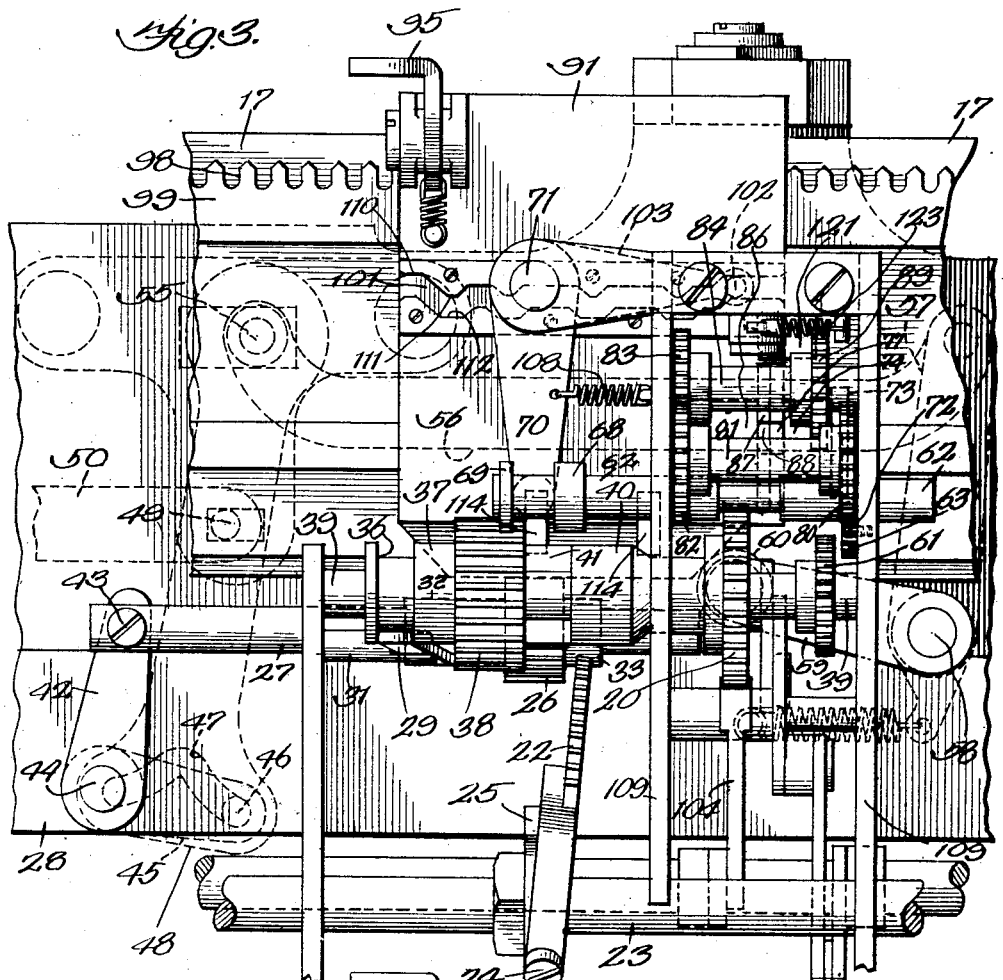
Fig. 3 is a view on an enlarged scale of some of the mechanism in the central portion of the machine.
Figure 8:
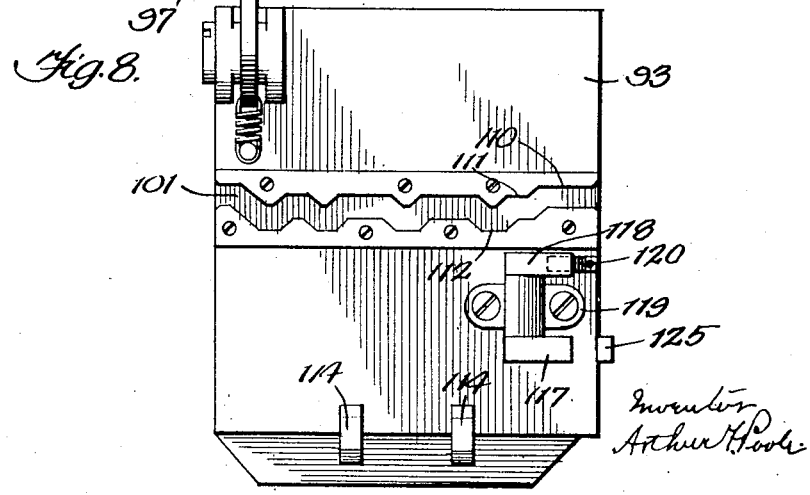
Fig. 8 is a front view of the adjustable mounting for the number column determining cams, and blocks on which these cams are mounted.

A second function of this actuator is to produce the partial counter clockwise rotation in Fig. 2 of a dog 21 which corresponds in some of its functions to the master dog of the cited Wahl patent. The direction of rotation of the wheel 20 is controlled by a gear shift shown best in Figs. 3 and 4.

Reference to the cited patent of Wahl will disclose that the motion of the numeral keys results in the differential motion of a certain sector which I have numbered 22 in this present application. The sector 22 is mounted on a shaft 23 rotatably mounted in the frame work. By reason of the sector 22 being pivoted at 24 on a block 25 which is rigidly attached to the shaft 23 and thus having a motion at right angles to the line of the shaft 23, said sector upon the depression of the keys first engages with a gear 26, then turns said gear an amount dependent upon the particular numeral key which has been operated, then moves out of mesh with said gear 26 and the shaft 23 returns to its normal position upon the upstroke of the keys. This action being described in the cited patent to Wahl need not be further described here.

The motion of the sector 22 as before noted is communicated to the gear 26 which is rotatably mounted upon a shaft 27 which is slidably mounted in the frame work 28. With the parts shown in their position in Figs. 3 and 4 the sector will engage the gear 26 and the wheel 20 will be rotated in the direction which corresponds to subtraction. When it is desired to throw the machine into addition the rod 27 is shifted by means hereinafter to be described and this results in a shifting of a lever 29 pivoted at 30 in a stud 31 mounted in the framework 28. Fig. 4. The gear 26 is held in its position on the rod 27 by a collar 32 and a collar 33, these collars being rigidly attached to the rod 27 and thereby preventing lateral motion of the gear 26.

The collar 32 on its underside, Fig. 4, has a slot 127 therein and in said slot projects a pin 34 mounted on the lever 29. A similar pin 35 mounted on the opposite end of said lever 29 engages a groove 36 in the hub 37 of a gear 38. Said gear and hub are slidably mounted on a shaft 39 which turns in the frame work 28. Rigid on said shaft is the wheel 20 and the hub of said wheel has a fork 40 into which engages a tongue 41 rigid to the gear 38. The mechanism constituting the reversing gearing just described is the well-known reversing mechanism used in the Wahl machine and is thoroughly described in my Patent No. 1,198,050, issued September 12, 1916. The particular parts referred to are shown in Fig. 2 and described in the paragraph beginning line 103, page 2 of said patent.

From the above arrangement it results that the motion of the sector will produce motion of the wheel 20 in the subtraction direction when the parts are in the position shown in Fig. 4. When the gear shift rod 27 is shifted to the left in Fig. 4 the gear 26 is moved to the left and the gear 38 is moved to the right. Further motion of the rod 27 will move the gear 26 still farther to the left and the gear 38 still farther to the right where said gear 38 will then be in a position to be engaged by sector 32. It is to be understood that the gear 26 and the gear 38 are in mesh at all times and the particular combination just described constitutes both a reversing and disconnect device for the gear 20. When the rod 27 is in its extreme right hand position in Fig. 4 the sector will engage the gear 26 and the wheel 20 will be rotated in a negative direction. When the gear shift rod 27 is moved a certain distance to the left the gears 26 and 38 will be in line with each other and will not be engaged by the sector. This position corresponds to the disconnect position of the machine. Further motion of the gear shift rod 27 to the left will result in placing the gear 38 in a position to be engaged by the sector and said engagement will rotate the gear 20 in a positive direction. This position is the addition position of the machine.

The position of the gear shift rod 27 is controlled by a lever 42 pivoted to the end thereof at 43, said lever being rigidly mounted on a shaft 44 rotatably mounted in the frame work 28 and having at its rear end a crank 45 having a pin 46 thereon, said pin engages with a slot 47 in a floating lever 48, said lever being controlled from its intermediate point 49 by links 50 which lead to a bell crank 51 mounted in the frame work at 52 and connected by a link 53 to a manually operated handle 54. The floating lever 48 is also controlled from its upper point 55 by a link 56 which is connected to a crank 57 rigidly mounted on a shaft 58 rotatably mounted in the frame work and carrying rigidly mounted on its other end a crank 59 (Figs. 4 and 7) on which is mounted a roller 60 adapted to be controlled by a set of cams hereinafter to be described traveling with the truck 17. The floating lever 48, the manual control therefor and the automatic control therefor are similar to the device described in a certain copending application of mine and also with the gear shift device at present on the Wahl cross footing machine now extensively marketed by the Remington Typewriter Company. The functions of the gear shift devices just mentioned are to afford the possibility of an automatic control of the rotation of the wheel 20 and also a manual control of the rotation of said wheel, the automatic control being obtained by the action of the roller 60 and the manual control being controlled by the action of the handle 54.

It will not be necessary to here go into a minute description of how these parts function since they are fully described in my cited copending application. I now come to the description of the parts which are peculiar to the checking machine forming a part of my herein described invention.

These checking parts have for their object the computing of certain functions of the digits of the numbers entered into the machine and written on the work sheet. These functions, which I shall hereinafter call the 9 and 11 functions, may be defined as follows:

The 9 function of a number is the sum of all its digits, e. g. the 9 function of 327 is 12.

The 11 function of a number is the algebraic sum of its digits counting the digits in the odd orders beginning at the units place as negative and the digits in the even orders as positive, e. g. the 11 function of 327 is $-(7+3)-2 = -8$.

If a column of numbers is added and the 9 functions of these numbers is also added and the algebraic sum of said addition of numbers is zero the algebraic sum of the 9 functions will either be zero or some multiple or 9. A demonstration of this fact is given in my copending application and need not be repeated here.

Again, if a sum of numbers be added and the word "addition" is used in its algebraic sense, that is, the numbers may be positive or negative, and the 11 functions are also added, if the algebraic sum of the numbers is zero, the algebraic sum of the 11 functions will be either zero or some multiple of 11. A demonstration of this fact is also given in my cited application.

In my herein described machine, I have provided mechanism for computing the 9 and 11 functions of the numbers represented by the motion of the wheel 20 and I have provided mechanism to determine when the algebraic sum of said 9 and 11 functions is zero or a multiple the one of 9 and the other of 11. I have also provided means for automatically determining the direction of rotation of the wheel 20 as the numbers are written by the keys and have so constructed my function computing mechanism that when a number is put into the machine in a negative direction the corresponding functions of said number will be entered itno the machine in a negative manner also.

I have also provided the carriage of the typewriter with a device which will prevent further operation on the machine in case the sum of the 9 and 11 function of the numbers entered into the machine is not zero or some multiple or both 9 and 11, that is, some multiple of 99.

I shall first describe the mechanism necessary to compute the 9 functions of the numbers entered into the machine.

On the shaft 39 which carries the gear 20 is rigidly mounted a gear 61 (Figs. 7 and 10), this gear having the same number of teeth as the gear 20. Meshing in the gear 61 is a gear 63 which is rigidly mounted on a shaft 62, said shaft being slidably and rotatably mounted in the frame work 28 and having rigidly mounted at its left hand end (Fig. 3) a pair of collars 68 and 69 which embrace the ends of a lever 70 mounted on a shaft 71 rotatably mounted in the framework 28. The motion of the shaft 71, therefore, serves to shift the rod 62 and the gear 63 rigidly mounted thereon.

The gear 63 may have any one of three positions, in the first of which, it is in contact with a stop 72 rigidly mounted on the frame work 28 and is out of mesh with the gear 61. However, said gear 63 when in its first position is in mesh with a gear 73 which is mounted on a sleeve 74 and on the other end of said collar is mounted a 9 function disk 75 having slots 76 and 77 therein, diametrically opposite. The sleeve 74 is rotatably supported on a rod 79 supported in the frame work 28. When in its first position the gear 63 is also in mesh with a gear 80, whose function will be hereinafter described.

When the gear 63 is moved by the lever 70 into its second position, it is in mesh with the gear 61. Motion of the gear 20 will therefore be transmitted to the gear 73, collar 74 and disk 75. The gear 73 has eighteen teeth; therefore, the disk 75 will make one revolution for every eighteen steps on the wheel 20, from which it follows that the slots 76 and 77 are nine steps apart.

When the gear 63 is thrown to its third position, it will remain in mesh with both the wheels 61 and 73, and the action in so far as it concerns the disk 75 will be the same as when the gear 63 is in its second position.

From the above, it will be apparent that when the gear 63 is in its first position, rotation of the wheel 20 will have no effect on the disk 75, but when the wheel 63 is in either its second or third position, the disk 75 will rotate synchronously with the gear 20 and the slots 76 and 77 in said disk will serve to determine intervals of nine steps of the gear 20. Assume, therefore, that the slot 76 is in register with a point on the framework at the beginning of the insertion of numbers into the machine. Then either the slot 76 or slot 77 will be in register with said point when the algebraic sum of the digits of the numbers inserted in the machine is either zero or some multiple of 9, it being obvious that when the direction of the rotation of the gear 20 is reversed, the direction of the rotation of the disk 75 will be reversed also.

A somewhat similar arrangement serves to compute the 11 functions. As before noted, when the gear 63 is in its first and second positions, it is in mesh with a gear 80 (Fig. 10) mounted on a shaft 81 rotatably mounted in the framework 28. On the other end of said shaft is a gear 82 and said gear meshes in a gear 83 mounted on a shaft 84 rotatably mounted in the frame work and said gear 83 meshes in a gear 85 having 22 teeth, which is mounted on a sleeve 86, which also turns on the rod 79.

On the other end of said sleeve is mounted the 11 function disk 87, having a slot 88 and a slot diametrically opposite (not shown) therein. Obviously when the gear 63 is in its second position the motion of the wheel 20 will be transmitted to the computing disk 87 and since the gear 85 has 22 teeth, eleven steps of the gear 20 will serve to bring the slot diametrically opposite the slot 88 into register with a certain projection on the framework.

When the gear 63 is in its third position, it will be out of mesh with the gear 80 and in mesh with a gear 89 which is rigidly mounted on the shaft 84 and is of the same size as the gear 83. Obviously when the gear 63 is in its third position, motion of the 11 function disk 87 will be reversed. It is to be observed that if the direction of rotation of the gear 20 be reversed from any cause, such for instance, motion of the rod 27, that the direction of rotation of the 11 computing disk 87 will be reversed also and this reversal will occur whether the gear 63 is in either its second or third position.

The reversal of the direction of rotation of the 11 function disk 87 occurs as the several digits of a number are written in the machine. It is to be remembered that the eleven function is formed by taking the difference between the sums of the digits in the odd decimal places and those in the even decimal places.

I shall now describe the means by which the position of the shaft 62 determines the position of the gear 63.

Adjustably mounted on the truck 17 of the machine are a series of blocks 90, 91, 92 and 93, these blocks being held in their position by latches 94, 95, 96 and 97 which engage with teeth 98 on a rack 99 which is mounted on the truck. The teeth 99 are spaced a distance apart, corresponding to the letter space movement of the typewriter carriage and the blocks 90, 91, 92 and 93 may be located in a position corresponding to the particular columns in which it is desired to write numbers.

These blocks 90, 91, 92 and 93 may be provided with two cams, one of these cams, shown on the block 92 and which I have numbered 100, serves to control the roller 60, which it will be remembered, controls the gear shift rod 27, which in its turn determines the direction of rotation of the gear 20 consequent upon actuation of a numeral key 11.

The cams 100 are put only on blocks defining a column on the work sheet in which are entered numbers to be added. Blocks defining columns of numbers to be subtracted are not provided with cams 100. The blocks 90, 91, 92 and 93 have also mounted on them a cam track 101 having three different levels and adapted to control a pin 102 mounted in a lever 103 rigidly mounted on the shaft 71 rotatably mounted in the frame work 28 and previously referred to, and which through its attached lever 70 serves to shift the rod 62 and the gear 63 attached thereto.

A spring 108 tends to turn the lever 70 in a counter clockwise direction (Fig. 3) and therefore will hold the gear 63 against the plate 109, which is a part of the framework. Consequently the lever 70 will always tend to maintain the rod 62 in its first position, in which position as heretofore noted, the motion of the gear 20 will not be transmitted to either the 9 or 11 computing device and said gear 63 will be held locked by reason of the stop 72 engaging in the teeth thereof.

The cam track 101 on the blocks has three levels. The first level 110 corresponds to the first position of the rod 62. The second level 111 corresponds to the second position and the third level 112 corresponds to the third position of said rod. These levels are so placed relative to the block that the pin 102 and the connected rod 62 will be shifted to properly compute the 9 and 11 functions of the numbers written into the machine. This is done by forming the cam track 101 so that it will reverse the direction of rotation of the 11 function disk at every alternate digit inserted in the machine and will hold the direction of rotation of the 9 function disk constant, assuming that the direction of rotation of the wheel 20 is not reversed during the insertion of a number. The levels 110 of the cam 101 are arranged to leave the rod 62 in its first position, which it will be remembered, corresponds to a disconnect position of both the 9 and 11 function disks, when the cam track 101 leaves the pin 102. The levels 111 and 112 of the cam 101 are of course, so arranged as to have the 11 disk turn in a negative direction in the units place of the number inserted, and also to reverse the direction of rotation of the 11 computing disk by shifting the rod 62 from its second to its third position at every alternate digit of the number inserted during the time said cam track is controlling the rod 62.

The blocks 90, 91, 92 and 93 are provided on their upper edges with index marks 113 which correspond in spacing to the numbers as written by the typewriter. The blocks 90, 91, 92 and 93 are also provided with projections properly spaced to coöperate with the master dog 21 so as to prevent operation of the machine in the decimal or pointing off spaces.

From what has gone before, it will be apparent that for numbers written in the machine during the time when any one of the blocks 90, 91, 92 or 93 are in the zone of action, the 9 and 11 function of the numbers written will be computed and that actuation of the numeral keys in the pointing off spaces will be prevented.

It will also be noted, that during the time the blocks are not in engagement with the pin 102, that the spring 108 will hold the rod 62 in its first position and that any numbers written in the machine will not, when the rod 62 is in said first position, rotate the function computing disks. This will allow the writing of numbers such as dates, serial numbers and any other non-computed number which it may be desired to write on the work sheet.

The last block 93, in addition to being provided with the cams above mentioned is also provided with a lock which has for its purpose the tying up of the machine in case the function computing devices do not show clear. This lock consists of a shaft 116 (Fig. 2) on which are rigidly mounted arms 117 and 118 and the shaft itself is rotatably mounted on the block 93 in a bearing 119 held to said block by screws, a leaf spring 120 serves to maintain the arms 117 and 118 in the position shown in Fig. 7.

The arm 118 is controlled by a cam 121 which is rotatably mounted at 122 in the frame work; a spring 123 serves to hold said cam in a normal position as determined by stop 124 mounted in the frame work 28 of the machine. As the carriage progresses toward the left, it is evident that the action of the cam 121 on the arm 118 will rotate the same against the tension of the spring 120 and that during the progress of the said carriage to the left (Fig. 5) the arm 118 will ride over the cam 121, thus preventing the arm 117 from rubbing on the disks 75 and 87 when passing over the same.

When the arm 118 is clear of the cam 121, the arm 117 is adapted to contact with the function computing disks 75 and 87 and the slots in said disks are so positioned that when they are in zero position, the arm 117 may pass through them.

It is to be observed that the arms 117 and 118 are mounted only on the last block 93 and that said block is not provided with a cam 100. Therefore, if the last number which has been written in the machine at the end of a horizontal line of writing returns the function computing disk to "clear," the arm 117 may pass through the slots in said disk and the typewriter carriage may be returned to the beginning of a new line. However, if the writing of said last number does not return both slots 76 and 88 in an alinement the arm 117 will catch on the edge of either of the disks 75 or 87 and motion of the typewriter carriage to the right (Fig. 1) will be prevented. On the block 93, I have also provided a lug 125 which is in the same horizontal line as the arm 117. Consequently, if the two slots are not in register, motion of the typewriter carriage to the left will also be prevented.

From the preceding it will be apparent that when the last number on a horizontal line of writing is written, that is, a number written in the zone or column corresponding to the position of block 93, and unless the writing of said number brings the slots in the function computing disks to their zero position, further motion of the typewriter carriage will be prevented and the checking machine as a whole will be tied up.

As previously pointed out, this condition will only arise when the predetermined total written on the horizontal line is not the correct total of the previous numbers written on said line and the locking up of the machine will thus give indication that an error has been made. It then will be necessary for the operator to call an inspector, who will then and there examine the original items from which entry has been made, the tally roll entry of the total written by the first operator and the ledger sheet as written by the first operator, and the error will be located at once.

I have provided the shaft 116 with a square hole 126 for the purpose of receiving a key which shall be kept in the possession of the inspector and the machine can be unlocked only by means of said key. It is obvious a lock of more complicated description could be provided for the shaft 116. The object of providing this key is to put it out of the power of the operator to unlock the machine in case an error is made. It is desirable that the discovery and correction of said error be done by a third and presumably disinterested party, so that the responsibility for the error may be at once located.

In Fig. 1, I have shown my checking machine as set up to compute a problem as below:

$$-A+B+C=D$$

or $$B+C-A-D=O$$

In this "A" indicates items to be subtracted, such for instance, as checks. "B" indicates items to be added, such for instance as deposits. "C" indicates items to be added, such for instance as a prior balance and "D" indicates items to be subtracted, such as a current balance. Obviously in the bank problem B+C—A equals D. It is to be remembered that the item "D" is not obtained from the checking machine but is determined from a predetermined total obtained by the operator of the checking machine from a tally roll made by the first operator.

I will now give an illustration of some work done on my machine and will choose as a particular illustration the writing of a daily entry on a customer's statement sheet of a bank. Assume that for some particular customer, the balance of the day before was $564.92, also assume that the collection department had turned in canceled checks for $65.42, $78.93, $42.65, and that the receiving teller had turned in a deposit slip for $125.00. The canceled checks and the deposit slips would be first handled by the ledger clerk. He would take the ledger sheet assigned to the particular customer and on which the previous transactions of the customer for the current month had been recorded and would enter thereon canceled checks for the amounts noted, the deposit slips for $125.00 and would also enter the previous day's balance of $564.92, and if the items had been correctly entered, his computing machine would show as a result a current balance of $502.92. This amount would be written on the ledger sheet and also on the tally roll.

The original items, that is the checks and deposit slips would afterward be handled by the second operator upon the checking machine. This operator would tabulate the machine to the first column represented by the position of block 90 on the checking machine and would write in said column the items $65.42, $78.93 and $42.65. The 9 and 11 computing device would compute and sum up the 9 and 11 function of these numbers and it is further to be noted that owing to the absence of a cam 100 on the block 90, such items will be entered into the machine as negative items.

The second operator would then tabulate to the position of block 91, the cam 100 on which would determine that any numbers written in that column would be entered into the machine in a positive direction. The operator would then write the amount on the deposit slip, viz. $125.00. The 9 and 11 functions of this amount being also computed and added algebraically to the 9 and 11 functions of the numbers written in the first column. The machine would then be tabulated to the position of block 92 and the previous day's balance of $564.92 would then be entered. The cam 100 on said block determines that this amount is entered into the machine in a positive direction. The carriage of the machine would then be tabulated to the position of block 93 and the amount $502.92 appearing on the tally roll made by the first operator as the current balance of that particular depositor would be written on the machine. The absence of a cam 100 on the block 93 determining that this amount is entered negatively, since this amount is the correct result of the prior balance plus the deposits minus the checks, the function disks 75 and 87 would return to either zero or some multiple of 9 and 11 respectively and there would be no interference either with the arm 117 or the lug 125 which fact would be indicated by the carriage of the machine being free to return to begin a new line.

However, if either operator had made a mistake in copying any of the original items or the prior day's balance wrongly, or if either operator had made a mistake in copying the total $564.92 wrongly, the machine would not be clear but locked up and the error would be known at the time when the second operator had finished writing the account in which the error occurred.

It is this latter consideration which is one of the most important features of my herein described invention, since it is well known that a large proportion of the time required to perform accounting operations is consumed in hunting for the errors which inevitably occur.

By my improved system and the use of my herein described machine, an error is made manifest when the second operator is handling an account in which an error has been made. Therefore, the error may be corrected at once and the responsibility for the same placed upon the operator making it. This system makes it possible to install a system of paying the operators by piece work and penalize them a certain amount for every error they make. I consider this feature of very great advantage.

It is to be noted that the herein described machine will give a false clear signal only in case the error made is an exact multiple of 99. An error of this magnitude is of such infrequent occurrence that I consider the probability of the same negligible. However, if it is wished to provide an additional check, this can be done by computing additional functions of the digits numbers entered into the machine. For instance, if one were to add and subtract the digits of the numbers in pairs and then subtract the number thus obtained from the original number, the result would be divisible by 101. As an example take the number 56789632 and form a function by adding 32, 78 and adding 96 and 56, calling the former positive and the latter negative and adding the two groups, this will give $$32 + 78 = +110$$
$$-(96 + 56) = -152$$
$$110 - 152 = -42$$

The 101 function of 56789632 is $-42$. Subtracting this from the original number gives 56789674 which is exactly divisible by 101 the quotient being 562274.

That, my herein disclosed checking machine is useful despite the fact that it will give a clear indication if the error is 99 or a multiple thereof is evinced by the fact that book-keepers use the 9 test alone in their so called method of "casting out nines" and this test or method of casting out 9 will give an erroneous result if the error is 9 or a multiple thereof. And the nine function computer in my herein described machine is a machine to automatically perform the book-keeper's test of "casting out nines." It must be borne in mind that the fact it is possible to purposely misoperate my checking machine is a factor which does not enter into the consideration of its usefulness for since the operators of the machine are penalized either in the way of having to do extra work in having to hunt for mistakes, it is a very safe inference that the operators will not purposely make these mistakes. They are more interested than anyone else in not making them. I have, therefore, found my machine very useful in spite of the fact that if there is an error made which is exactly 99 or some exact multiple thereof the machine will indicate "clear."

As the master wheel 20 is described in the foregoing specification, it apparently has no function, since this wheel does not serve to enter numbers into any totalizer. However, the actuator of the herein described machine is substantially the same as the actuator used in the cited Wahl machine and in such machines there is a master pawl which I have numbered 104 herein (Fig. 2) which works synchronously with the master dog 21 and serves to aline the master wheel 20. I have retained this pawl in my machine since it is desirable that the wheel 20 be alined at the end of every key stroke and this serves to maintain the various gears constituting the 9 and 11 function computing trains in their proper alinement.

It may be desirable to place a truck lock on this machine with an object of preventing the motion of the typewriter carriage during the time a key is depressed. While I have not shown such a lock it can be very readily placed on the machine by making the lugs 114 a continuous ledge extending the entire length of the block 93 and providing teeth in said ledge into which the master dog 21 is adapted to enter and leaving said teeth absent in the spaces corresponding to the lugs 114, that is, the spaces corresponding to the decimal or pointing off spaces. I have not shown a drawing of this modification since it is an obvious one and can be readily applied to my machine by those skilled in the art.

In order to sum up concisely the herein described method of handling accounts, I wish to point out the fundamental difference between my checking machine and computing machines of the prior art. In these structures, numbers were put into the machine and the sum (by the word sum I refer to the algebraic sum which may be either positive or negative) of the numbers inserted into the machine was determined from some part of the machine itself. In a visible totalizing machine such as the Wahl, the number was directly copied from the indication of the totalizer. In the case of a machine such as the Dalton, the number was printed out of the machine as determined by the displacement of the totalizer wheels. Nevertheless both of these machines have one feature in common, that is, that the number which is printed as the sum of a series of items is determined by the machine into which said items are entered.

In my herein described checking machine, the only thing which is determined by the machine itself is whether or not the predetermined total which has been copied on the work sheet is the correct sum of the items previously entered into the machine. If this predetermined total is not the correct sum there is no way of ascertaining the magnitude of the error. The machine simply informs the operator that the number entered as a total is not the correct sum of the numbers previously entered into the machine and in my herein described machine there is no way provided for determining the amount of such error. Of course, it is possible by observing the displacement of the disks used to compute the 9 and 11 functions to determine how much the magnitude of the error differs from the nearest multiple of 99 but there is no indication whatever, of the absolute magnitude of the error. Assuming that the error thus indicated is 15 the total error may be 15, 114=99+15, 213=198+15, etc. I would therefore, say that the fundamental difference between my checking machine and the prior art structures is that my checking machine determines when the algebraic sum of the numbers that have been entered into it is zero, while machines of the prior art determine how much the algebraic sum of the numbers entered into it differs from zero as previously pointed out. When original items are handled by two operators each of whom makes an account sheet there is no logical necessity for the second operator to have any information whatever concerning the numbers written by her on the customer's statement other than the facts, first: that the sum of these numbers is zero, this corresponding to the case of where the checking machine will show clear, and second: that the sum of these numbers is not zero, this corresponding to the case of where the checking machine is locked up. In the first instance, the sheet may be taken as proved. In the second instance, an error has been made in the particular account then being written up and such an error should be at once searched for and corrected.

It will be readily apparent that owing to the checking machine being so constructed that it will give only an indication of whether or not the algebraic sum of the items entered into the machine is zero, it is possible to make this machine much simpler and capable of much more rapid operation than the machines of the prior art in which the computing machine has to give an indication of the absolute value of the algebraic sum of the numbers previously entered therein.

I believe my herein described machine is unique in the above mentioned particulars and I wish to claim the same broadly.

In some of the claims I have referred to a "function computing mechanism" by which I mean mechanism which will compute certain functions of the digits of the numbers entered into the machine as distinguished from a totalizing mechanism which adds not only the digits of a number but also the powers of ten associated with said digits, these powers being arranged in a descending order from the digit in the left hand place and each power of 10 being one lower than the one to the left of it.

For example the numbers calculated by said machines of the prior art are of the following form:

$$10^n a_n + 10^{n-1} a_{n-1} + 10^{n-2} a_{n-2} \ldots 10^3 a_3 + 10^2 a_2 + 10^1 a_1 + 10^0 a_0$$

It will be observed that the powers of 10 associated with the various digits $a_n$, $a_{n-1}$ etc., decrease by 1 toward the right and this characteristic is present in all numbers handled by said prior art machines.

Consider now the forms of the digit functions typical of those which are computed by my herein disclosed checking machine.

Let
$$F_n(a_0 a_1 a_2 \ldots) = F_n(p)$$
be a function of the digits $a_0 a_1 a_2 \ldots$ of a number $p$.

Then the kind of functions which are computed by my herein disclosed mechanism are those which the following defined property, viz.

Let $F_n(P)$ be the $n$ function of the digits of any number $p$. Then $P - F_n(p)$ is exactly divisible by $n$.

To cite specific examples giving $n$ concrete values—

The
$$F_9(p) = a_0 + a_1 + a_2 + a_3$$
where $a_0$ is the digit in the unit place of $p$.
$$5248 - (8+4+2+5) = 9 \times 581$$

Some specific examples of similar functions are given below:
$$F_9(p) = a_0 + a_1 + a_2 + a_3 \ldots$$
$$F_9(5248) = 8 + 4 + 2 + 5 = 19$$
$$5248 - 19 = 5229 = 9 \times 581$$

$F_9(p)$ is the function computed by the disk 75 herein.
$$F_{11}(p) = a_0 - a_1 + a_2 - a_3 = \Sigma a_{2n} - \Sigma a_{2n+1}$$
$$F_{11}(5248) = 8 - 4 + 2 - 5 = 1$$
$$5248 - 1 = 5247 = 11 \times 477$$

$F_{11}(p)$ is the function computed by the disk 87 herein.
$$F_{99}(p) = a_0 + 10a_1 + a_2 + 10a_3 \ldots$$
$$F_{99}(5248) = 8 + 2 + 10(4+5) = 100$$
$$5248 - 100 = 5148 = 52 \times 99$$
$$F_{101}(p) = a_0 + 10a_1 - a_2 - 10a_3 + a_4 + 10a_5 - \cdots$$
$$F_{101}(5248) = 48 - 52 = -4$$
$$5248 - (-4) = 5252 = 101 \times 52$$
$$F_{999}(p) = a_0 + 10a_1 + 100a_2 + a_3 + 10a_4 + 100a_5 + \cdots$$
$$F_{999}(5248) = 248 + 5 = 253$$
$$5248 - 253 = 4995 = 999 \times 5$$
$$F_{1001}(p) = a_0 + 10a + 100a_2 - a_3 - 10a_4 - 100a_5 + \cdots$$
$$F_{1001}(5248) = 248 - 5 = 243$$
$$5248 - 243 = 5005 = 1001 \times 5$$

Other functions of the digits having similar properties of the functions first given might be cited. However, the distinction between the digit functions computed by the machine of the prior art and the digit functions computed by my herein disclosed machine is apparent and I wish to claim broadly the mechanism for computing functions of the form $F_n(p)$ as defined by the equation:
$$p - F_n(p) = Kn$$
where $K$ and $p$ are integers.

Throughout the claims I wish the term "function computing mechanism" to be taken in the above defined sense as distinguished from a mechanism such as a totalizer which computes the numbers themselves.

Many changes and modifications may be made in the precise mechanism disclosed herein without departing from the spirit thereof, since I claim:

1. In a calculating machine the combination of a set of keys, differential mechanism controlled by said keys whereby numbers may be entered in said machine, a traveling carriage, mechanism for computing the 9 functions of the numbers entered in said machine and means to lock the machine when said 9 function computing mechanism does not stand at zero.

2. In a calculating machine the combination of a set of keys, differential mechanism controlled by said keys whereby numbers may be entered in said machine, a traveling carriage, mechanism for computing the 9 functions of the numbers entered in said machine and means to lock the carriage of the machine when said 9 function computing mechanism does not stand at zero.

3. In a calculating machine the combination of a set of keys, differential mechanism controlled by said keys whereby numbers may be entered in said machine, a traveling carriage, mechanism for computing the 9 functions of the numbers entered in said machine and means adjustable on said carriage to lock the machine when said 9 function computing mechanism does not stand at zero.

4. In a calculating machine the combination of a set of keys, differential mechanism controlled by said keys whereby numbers may be entered in said machine, a traveling carriage, mechanism for computing the 11 functions of the numbers entered in said machine and means to lock the machine when said 11 function computing mechanism does not stand at zero.

5. In a calculating machine the combination of a set of keys, differential mechanism controlled by said keys whereby numbers may be entered in said machine, a traveling carriage, mechanism for computing the 11 functions of the numbers entered in said machine and means to lock the carriage of the machine when said 11 function computing mechanism does not stand at zero.

6. In a calculating machine the combination of a set of keys, differential mechanism controlled by said keys whereby numbers may be entered in said machine, a traveling carriage, mechanism for computing the 11 functions of the numbers entered in said machine and means adjustable on said carriage to lock the machine when said 9 function computing mechanism does not stand at zero.

7. In a calculating machine the combination of mechanism adapted to enter a series of numbers in said machine both positively and negatively, a function computing mechanism, a traveling carriage and means controlled by said carriage to determine how the numbers shall be entered into the machine and whether or not said numbers shall be computed by said function computing mechanism.

8. In a calculating machine the combination of mechanism adapted to enter a series of numbers in said machine both positively and negatively, a function computing mechanism, a traveling carriage and means adjustably mounted on said carriage to determine how the numbers shall be entered into the machine and whether or not said numbers shall be computed by said function computing mechanism.

9. The herein described method of handling accounts which consists in writing items and obtaining a total thereof, writing the items a second time from the original items and copying said predetermined total on a machine which will give an indication of whether said predetermined total is the correct total of the items written the second time.

10. The herein described method of handling accounts which consists in writing the original items and obtaining a total thereof, writing the items a second time on a machine equipped with a function computing device writing the total of said items as already obtained and observing whether or not said function computing device stands at clear as a result of writing said items and the predetermined total thereof.

11. The herein described method of handling accounts which consists in writing original items and the total thereof and simultaneously making an additional copy of said total, writing the items a second time and copying said predetermined total from said additional copy and observing whether or not the writing of said predetermined total clears the machine used for the second writing.

12. The herein described method of handling accounts which consists in writing original items on a computing machine and obtaining the total thereof, making a duplicate copy of said total, writing the items a second time on a computing machine, copying the total of said items as said total was obtained by the first operator and observing whether said second machine stands at clear.

13. The herein described method of handling accounts which consists in writing items on a computing machine and obtaining the total thereof making a duplicate copy of said total, writing the items a second time on a machine equipped with a device for computing the functions of said numbers, writing the predetermined totals and observing whether said machine stands at clear.

14. In a calculating machine the combination of a set of keys, differential mechanism controlled by said keys whereby numbers may be entered in said machine, a traveling carriage, a function computing mechanism and a lock for said machine governed by said function computing mechanism.

15. In a calculating machine the combination of a set of keys, differential mechanism controlled by said keys whereby numbers may be entered in said machine, a traveling carriage, a function computing mechanism and a lock for said carriage governed by said function computing mechanism.

16. In a calculating machine the combination of a set of keys, differential mechanism whereby numbers may be entered in the machine, a traveling carriage, a function computing mechanism adapted to be governed by said differential mechanism, a lock for said machine mounted on said carriage and adjustable thereon, the effectiveness of said lock being governed by said function computing mechanism.

17. In a calculating machine the combination of a set of numeral keys, differential mechanism controlled by said keys, a traveling carriage, a function computing mechanism, a plurality of cams on said traveling carriage and means governed by said cams to govern the action of said function computing mechanism.

18. In a calculating machine the combination of a set of numeral keys, a differential mechanism actuated by said keys, a function computing mechanism controlled by said differential mechanism, a traveling carriage, a plurality of cams on said traveling carriage and means governed by said cams to govern the action of said function computing mechanism.

19. In a calculating machine the combination of a set of numeral keys, a differential mechanism actuated by said keys, a function computing mechanism controlled by said differential mechanism, a traveling carriage, a plurality of cams on said traveling carriage, each cam having two distinct levels and means to govern the action of said computing mechanism by any one of said cams.

20. The method of handling accounts which consists in writing the original items constituting the memorandum of the customer's transactions and a predetermined total of said items on a machine provided with mechanism to compute functions of the form $$p - F_n(p) = Kn$$

where K is an integer, and observing whether or not said operations of writing said original items and said predetermined total returns said function computing mechanism to an integral multiple of $n$.

21. In a calculating machine, the combination of a traveling carriage, a set of keys, differential mechanism controlled by said keys whereby numbers are entered into the machine, a function computing device, a plurality of cams whose position is controlled by said carriage to determine at what zones of calculation during the travel of said carriage said function computing mechanism shall compute certain functions of the numbers entered into the machine by said keys.

22. In a calculating machine, the combination with mechanism to enter a number in said machine, of means to compute the 9 function of the number entered by said mechanism, a traveling carriage and means under control of said traveling carriage to render said 9 function computing mechanism operative at a plurality of zones in the travel of said carriage.

23. In a calculating machine, the combination with mechanism to enter a number in said machine, of means to compute the 11 function of a number entered by said mechanism, a traveling carriage and means under control of said traveling carriage to render said 11 function computing mechanism operative at a plurality of zones of computation in the travel of said carriage.

In witness whereof I have hereunto subscribed my name.

ARTHUR F. POOLE.